United States Patent [19] [11] Patent Number: 5,024,890
Pollet et al. [45] Date of Patent: Jun. 18, 1991

[54] SIZE COMPOSITION FOR IMPREGNATING FILAMENT STRANDS AND GLASS FIBERS COATED THEREIN

[75] Inventors: Jean C. Pollet, Granville; Gary L. Williams; Gordon P. Armstrong, both of Newark; Martin C. Flautt, Granville, all of Ohio

[73] Assignee: Owens-Corning Fiberglass Corporation, Toledo, Ohio

[21] Appl. No.: 275,158

[22] Filed: Nov. 22, 1988

Related U.S. Application Data

[63] Continuation of Ser. No. 24,954, Mar. 12, 1987, abandoned.

[51] Int. Cl.$^5$ .......................... B32B 9/00; D02G 3/00
[52] U.S. Cl. ..................................... 428/372; 65/3.43; 428/378; 428/389; 428/391; 428/392; 428/401
[58] Field of Search .............. 428/375, 378, 391, 392, 428/372, 379, 401, 389; 65/3.43

[56] References Cited

U.S. PATENT DOCUMENTS

| | | | |
|---|---|---|---|
| 2,723,208 | 11/1955 | Morrison | 427/389.8 X |
| 3,450,658 | 6/1969 | Morison | 427/389.8 X |
| 3,773,546 | 11/1973 | Marzocchi | 524/538 X |
| 4,069,184 | 1/1978 | Ferraro et al. | 524/602 |
| 4,225,650 | 9/1980 | Van Brederode | 525/387 X |
| 4,424,239 | 1/1984 | Nota et al. | 524/538 X |
| 4,762,751 | 8/1988 | Girgis et al. | 428/268 X |

Primary Examiner—Lorraine T. Kendell
Attorney, Agent, or Firm—Patrick P. Pacella; Catherine B. Martineau

[57] ABSTRACT

An aqueous size composition for glass fibers is disclosed which includes a coupling agent, a binder or film former material and a thermoplastic polymer resin powder, wherein said composition is applied to the glass fiber surfaces during the fiber forming process. A rheology modifier material may be added to the size composition. One embodiment of the composition includes an organosilane coupling agent, a polyethylene oxide binder material and a polyamide thermoplastic polymer resin.

13 Claims, No Drawings

SIZE COMPOSITION FOR IMPREGNATING FILAMENT STRANDS AND GLASS FIBERS COATED THEREIN

This is a continuation of application Ser. No. 024,954, filed 3/12/87, now abandoned.

TECHNICAL FIELD

This invention relates to a size composition useful for impregnating a highly loaded, impregnated fibrous strand where the impregnation takes place during the fiber forming operation. In one of its more specific aspects, this invention relates to a process for producing thermoplastic powder impregnated glass fiber strands.

BACKGROUND OF THE INVENTION

The production of impregnated fibers and the application of thermoplastic resins to the fibers is well-known.

Sizing compositions typically employed as coatings for glass fibers have conventionally been applied to the surface of the glass fibers after the glass fiber has been formed. Typically it is necessary to first produce the glass fibers by providing a thin layer of a size composition to the surface of the bare glass fibers. The size composition must be compatible with the glass fiber and the resin which is subsequently applied to the sized fiber. The size composition serves to improve the bonding relationship between the glass fibers and the polymeric or thermoplastic resins. The glass fibers are then collected into a strand and the strand is wound around a take-up bobbin to form a substantially cylindrical package, conventionally termed a "yarn package". The yarn package is then air dried or subjected to elevated temperatures in order to dry the size composition applied to the surface of the glass fibers. The glass fibers are thereafter impregnated with the thermoplastic resin to form an impregnated yarn or cord.

Considerable time and expense would be saved if a size composition useful for impregnating strands with a thermoplastic resin were available which could be applied during the fiber forming process without the need for non-aqueous solvents, fluidized beds, sheaths or time-consuming manufacturing processes.

Further, considerable processing time would be saved if the glass fiber could be pre-impregnated with the thermoplastic resin during the glass fiber forming process. Moreover, it would be beneficial if a size composition could be employed which could be directly blended with the thermoplastic resin during the glass fiber forming process.

SUMMARY OF THE INVENTION

According to the present invention, there is provided a slurry composition for impregnating glass fibers which includes a thermoplastic resin, a coupling agent such as a silane, a binder or film former material and a thickening agent. A rheology modifier may also be added to the composition. The slurry composition is applied to the glass fiber during the fiber forming operation. The composition of this invention can thus be applied as a size for glass fibers during the fiber forming operation and the resulting sized thermoplastic impregnated glass fibers can then be fabricated into glass fiber reinforced products.

According to the present invention, there is no need to first apply a sizing composition to the glass fibers and thereafter impregnate the resulting sized glass fibers with a compatible polymeric resin matrix in order to provide a glass fiber reinforced product. A preferred composition of the present invention includes organosilane, polyethylene oxide, Nylon 6 powder and water, wherein the thermoplastic content is approximately 23%, relative to the total weight of the impregnated glass strand.

Also, according to this invention there is provided a glass fiber impregnated with the above-identified thermoplastic composition. The thermoplastic impregnated glass fiber is easy to handle and to fabricate into end use items. Also, the thermoplastic impregnated glass fiber has excellent mechanical properties relative to commercially available thermoplastic impregnated glass fibers.

These and other aspects and advantages of the present invention will become clear after consideration is given to the detailed description of the invention which follows.

DETAILED DESCRIPTION OF THE INVENTION

The present invention relates to a slurry composition useful for producing an improved yarn or strand (bundle of filaments) pre-impregnated with a thermoplastic polymer during the filament forming operation.

The present invention is compatible with any glass fiber conventionally utilized for the reinforcement of polymeric resins. The term "glass fibers" as used herein shall mean filaments formed by attenuation of one or more streams of molten glass and to strands formed when such glass fiber filaments are gathered together in the forming process. The term shall also mean yarns and cords formed by applying and/or twisting a multiplicity of strands together and to woven and non-woven fabrics which are formed of such glass fiber strands, yarns, or cords. Preferably, the size formulation of the present invention is useable with E-type fibers having a diameter in the range of from about 0.35 to about 0.75 mil.

The individual components utilized in the practice of this invention are commercially available and can thus be simply blended with one another in the preparation of the formulation embodying the features of the present invention.

Generally, the composition of this invention may contain a carrier solvent, normally water, a coupling agent, a binder or film former material, a thickener or rheology modifier material, and a matrix thermoplastic resin powder dispersed in the sizing to form a slurry.

Any suitable coupling agent can be employed in the successful practice of this invention. The coupling agent acts to produce adhesion between the matrix resin and provide strength development and retention of the matrix resin in the slurry. One example of a suitable coupling agent is a silane. Preferably, the silane is an organosilane including, for example, gamma-aminopropyltriethoxysilane (commercially available from Union Carbide under the trade name "A-1100"). The coupling agent will normally be contained in an amount within the range of from about 0.05 to about 5 percent, by weight, of the slurry mixture.

Any suitable binder material can be employed. The binder or film former material aids in the handling and processing of the filament during the fiber forming process. Suitable binder or film former materials are, for example, epoxy, polyester, polyvinyl acetate, polyvinyl alcohol, acrylics, or other chemicals which have the ability to bond the thermoplastic powder particles to the fiber upon the evaporation of the water or which have the ability themselves to suspend the particles in the slurry and subsequently bond themselves to the fiber. The binder material will normally be contained in an amount within the range of from about 0.5 to about 5 percent, by weight, of the slurry mixture.

Any suitable thickener material can be employed. The thickener material acts as a rheology modifier so that the thermoplastic powder particles will actually adhere to the fiber. Without the thickener material the thermoplastic powder particles may stay behind on the rolls of the applicator while the carrier solvent goes on the fiber. The result would be a rapid build-up of powder on the applicator rolls, which in turn, rapidly causes fiber breakage.

Any suitable resin can be employed. The thermoplastic resins are dispersed into the sizing in the form of fine particles. In a preferred embodiment the size of the powder particles are between about 1 to 50 microns, or more preferrably between about 10-30 microns. According to the present invention the resin powders can be applied to the filaments in an amount within the range of of between about 5 to about 50 percent, by weight, of the final prepreg yarn or strand. In preferred embodiments the amount of the thermoplastic polymer resin in the aqueous size composition ranges either from about 20 to about 35, or from about 30 to about 50 weight percent of the aqueous size composition. One particularly suitable resin is Nylon 6, [imino(1-oxo-1,6-hexamediyl)].

According to the present invention the sizing composition suspends the thermoplastic powder particles in the slurry. The slurry compositions of this invention are best produced by blending all materials in their liquid state with agitation. A uniform coating of the composition can be applied to the glass fibers in any suitable manner during the fiber forming process. Preferably, the compositions of the present invention are applied to the surface of the glass fiber in the manner described in the co-pending U.S. application Ser. No. 07/269,059 filed Nov. 9, 1988 which is a continuation of Ser. No. 07/024,953 filed Mar. 12, 1984, now abandoned, (the entire disclosure thereof being expressly incorporated herein to by reference). The resultant slurry composition is sufficiently liquid to be applied to the fibers during the fiber-forming operation. Each fiber is coated by the slurry mixture as the fibers are formed, that is, at or about the place in their formation where the conventional size compositions are typically applied (e.g., between the bushing and the spindle on which the fibers are wound as a package). In one fiber formign process, the continuous fibers leave the bushing and are dipped into the slurry and are impregnated with the slurry. The highly loaded fibers are subsequently dried in order to evaporate or remove the water. The impregnated strands are then cured in order to set the binder or film former material. The curing or setting "glues" the powder particles along the surface of the fibers. The resultant impregnated strands can be subsequently heated to allow the melted thermoplastic polymers to fuse.

It is also within the contemplated scope of this invention that organic or inorganic particulates, such as metallic fillers useful in producing conductive rovings, may also be used with the thermoplastic polymer powder particles. These fillers can either be pre-combined with the polymer so that each powder particle contains polymer and filler or be added separately as a powder to the slurry.

The resultant impregnated strands can be chopped, either before or after drying, to be used for such operations as injection molding. Continuous thermoplastic impregnated strands can be filament wound or pultruded to achieve thermoplastic fiber reinforced end use items.

While the above describes the present invention with sufficient particularity, the following is intended to further exemplify the present invention. The following thermoplastic slurry was applied to glass fibers during the forming operation to achieve a thermoplastic content of 23% relative to the total weight of the prepreg strand.

| Composition and Range | | Example | |
| --- | --- | --- | --- |
| Polyamide powder | 30 to 50% | Orgasol 1002D | 40% |
| Polyoxyethylene | .5 to 5% | Polyox WSR 205 | 1.2% |
| Coupling Agent | .05 to 5% | A1100 | .2% |
| Water | balance to 100% | Water | 58–60% |

The polyamide thermoplastic powder has preferably an average particle size between 5 and 40 microns and no particle retained by an 80-mesh screen (more preferably 115 mesh, most preferably 200 mesh). Orgasol 1002D is a polyamide, Nylon 6 powder available from ATOCHEM (France). Polyox WSR 205 is a tradename for polyethylene oxides available from Union Carbide; other polyethylene oxides of different molecular weight, molecular weight distribution or branching may also be suitable, such as any of the Polyox series having a molecular weight between 100,000 and 4,000,000. A1100 is gamma-aminopropyltriethoxysilane available from Union Carbide.

Once the slurry was mixed together, continuous glass fibers were coated with the slurry mixture. The impregnated glass fibers were then collected into a strand, and the strand was then wound around a take-up bobbin to form a substantially cylindrical package. The yarn package was dried so as to evaporate the water from the impregnated strands and then set so as to allow the binder material to "glue" the thermoplastic powder particles along the surfaces of the glass fibers.

Composites molded from the prepreg strands made by using the example formulation exhibit properties superior to those of competitive products.

As can be readily seen from Table I, the thermoplastic impregnated strand, having 77% glass content, of the present invention, has greatly improved mechanical properties over the commercially impregnated strands. In particular, the longitudinal tensile strength and flexural strength are better than the prior art prepregs tested. Also, the thermoplastic impregnated strand has greatly improved transverse flexual strength and flexural modulus. The improvement in the thermoplastic prepreg formed by the present process is most evident when compared to a prior art prepreg having a similar percentage of glass content, by weight.

It will be evident from the foregoing that various modifications can be made to this invention. Such, however, are considered as being within the scope of the invention.

| | COMPARATIVE PROPERTIES OF COMPRESSION MOLDED UNDIRECTIONAL GLASS/POLYAMIDE 6 COMPOSITES | | | | | | | | |
|---|---|---|---|---|---|---|---|---|---|
| | | LONGITUDINAL | | | | TRANSVERSE | | | |
| Prepreg Type | Measured (M) Published (P) Data | Tensile Strength ($10^3$ psi) | Tensile Modulus ($10^6$ psi) | Flexural Strength ($10^3$ psi) | Notched Izod Impact (ft. lb/in) | Flexural Modulus ($10^6$ psi) | Flexural Strength ($10^3$ psi) | Flexural Modulus ($10^6$ psi) | Glass Content (Percent) |
| Powder Slurry | M | 131 | 6.9 | 132 | 59 | 6.5 | 5.2 | 1.2 | 77 |
| Control A* | M | 64 | 3.4 | 78 | 64 | 3.1 | 4.0 | .44 | 50 |
| Control A* | P | 92 | 4.2 | 90 | 90 | 3.3 | — | — | 60 |
| Control B** | M | 83 | 6.3 | 72 | 72 | 6.1 | .9 | .24 | 74 |

*PCI NG GL 50
**ATO 1200 TEX

We claim:

1. A glass fiber having a coating thereon, consisting essentially of a coupling agent, a film former material and a thermoplastic polymer resin powder wherein the coating is the dried residue formed by evaporation of water from an aqueous composition comprising, in weight percent, based on the weight of the aqueous composition, about 0.05 to about 5.0 wt. % coupling agent, about 0.5 to about 5.0 wt. % film former material and about 30 to about 50 wt. % thermoplastic polymer resin powder.

2. The glass fiber of claim 1 wherein the coupling agent is gamma-aminopropyltriethoxysilane.

3. The glass fiber of claim 1 wherein the thermoplastic resin is a polyamide resin.

4. The glass fiber of claim 1 wherein the thermoplastic polymer resin is a Nylon 6 resin.

5. The glass fiber of claim 1 wherein the thermoplastic polymer resin is poly[imino(1-oxo-1,6-hexanediyl)].

6. The glass fiber of claim 1 wherein the binder material is polyethylene oxide.

7. The glass fiber of claim 1 wherein the thermoplastic polymer resin is present in average particle size between about 1 to about 40 microns.

8. The glass fiber of claim 1 wherein the aqueous composition contains metallic powders.

9. The glass fiber of claim 1 wherein the aqueous composition further comprises a rheology modifier material.

10. The glass fiber of claim 1 wherein the aqueous composition comprises, in weight percent of the following: The thermoplastic polymer resin powder comprising Nylon 6 powder in an amount of about 40.0 wt. percent; the film former material comprising polyethylene oxide in an amount of about 1.2 wt. percent; the coupling agent comprising gamma aminopropyltriethoxysilane in an amount of about 0.2 wt. percent; and water in an about of about 58–60 wt. percent.

11. A plurality of glass fibers, at least a portion of the fibers' surfaces having a coating thereon consisting essentially of a coupling agent, a film former material and a thermoplastic polymer resin powder wherein the coating is the dried residue formed by evaporation of water from an aqueous composition comprising, in weight percent, based on the weight of the aqueous composition, about 0.05 to about 5.0 wt. % coupling agent, about 0.5 to about 5.0 wt. % film former material and about 30 to about 50 wt. % thermoplastic polymer resin powder.

12. The glass fiber of claim 11, wherein said organosilane is gamma aminopropyltriethoxysilane.

13. The glass fiber of claim 11, wherein said polyamide thermoplastic resin is poly[imino(1-oxo-,6-hexanediyl)].

* * * * *